United States Patent [19]
Plut et al.

[11] Patent Number: 5,058,148
[45] Date of Patent: * Oct. 15, 1991

[54] TELEVISION CAMERA CONTROL IN RADIATION IMAGING

[75] Inventors: Leonard F. Plut, Willowick; David Nicolay, Fairview Park, both of Ohio

[73] Assignee: Picker International, Inc., Cleveland, Ohio

[ * ] Notice: The portion of the term of this patent subsequent to Jan. 31, 2006 has been disclaimed.

[21] Appl. No.: 220,508

[22] Filed: Jul. 18, 1988

Related U.S. Application Data

[63] Continuation of Ser. No. 50,727, May 15, 1987, Pat. No. 4,802,002.

[51] Int. Cl.$^5$ .............................................. H05G 1/64
[52] U.S. Cl. ...................................... 378/99; 358/111
[58] Field of Search ................... 378/99; 358/111, 211, 358/209, 224, 213.13, 181; 379/99

[56] References Cited

U.S. PATENT DOCUMENTS

| | | | |
|---|---|---|---|
| 3,558,815 | 1/1971 | Banks | 358/181 |
| 4,254,434 | 3/1981 | Suzuki | 358/181 |
| 4,319,278 | 3/1982 | Shimizu | 358/181 |
| 4,555,728 | 11/1985 | Fenster et al. | 378/99 |
| 4,612,572 | 7/1986 | Komatsu et al. | 378/99 |
| 4,628,355 | 12/1986 | Ogura et al. | 378/99 |
| 4,802,002 | 1/1989 | Plut et al. | 378/99 |

*Primary Examiner*—Craig E. Church
*Attorney, Agent, or Firm*—Watts, Hoffmann, Fisher & Heinke Co.

[57] ABSTRACT

Improved apparatus, circuitry and method is disclosed for control of a television camera in a radiographic imaging system. The system includes a radiation source, an image intensifier tube and several associated components for acquiring analog radiation representing images in one or more of several prime analog study modes. The analog acquisition components include any one or a combination of a cine camera, a spot film camera and a spot film device. Radiation is directed from the source through a subject to the intensifier tube input and to selected analog acquisition components. As the analog images are acquired, a television camera views the image tube output to produce another image, by way of a monitor, in verification that the radiation exposure is of a character suitable for the selected analog image acquisition mode. Sets of representations of camera operating parameter value decisions are stored in nonvolatile random access memory circuitry coupled to the camera. Each set of representations corresponds to a different analog study mode, or combination of modes. Means is provided for selection of one or a combination of analog study modes. In response to that selection, the corresponding set of camera operating parameter decision respresentations is applied to the camera, in order to optimize camera performance for the particular x-ray mode, or combination of modes, which has been selected. In another embodiment, apparatus and circuitry is provided for suppressing the camera video signal in response to a selection of a predetermined video camera scan rate, while maintaining transmission of synchronization signals from the camera to the monitor.

3 Claims, 9 Drawing Sheets

CCU 44

INTERFACE 50

VERIFICATION CARD 108

CAMERA PARAMETERS

| X-RAY SYSTEM OPERATING MODES | SYNC (SCAN FORMAT) | AGK ON/OFF | VIDEO GAIN | IRIS APERTURE | BIAS LIGHT ON/OFF | BIAS LIGHT LEVEL | LINE LOCK XTAL | FILTER | GAMMA |
|---|---|---|---|---|---|---|---|---|---|
| ANALOG FLUOROSCOPY | 525 LINE INTERLACED 30 FPS | ON | N/A | VERIFICATION PRESET 1 OF 256 LEVELS | PRESET OFF | N/A | LINE LOCK | NO FILTER SELECTED | VERIFICATION PRESET 0.3, 0.5, 0.7, 1.0 |
| ANALOG SPOT FILM CAM VERIFICATION | 525 LINE INTERLACED 30 FPS | OFF | VERIFICATION PRESET 1 OF 16 LEVELS | VERIFICATION PRESET 1 OF 256 LEVELS | PRESET OFF | N/A | LINE LOCK | NO FILTER SELECTED | VERIFICATION PRESET 0.3, 0.5, 0.7, 1.0 |
| ANALOG SPOT FILM DEV. VERIFICATION | 525 LINE INTERLACED 30 FPS | OFF | VERIFICATION PRESET 1 OF 16 LEVELS | VERIFICATION PRESET 1 OF 256 LEVELS | PRESET OFF | N/A | LINE LOCK | NO FILTER SELECTED | VERIFICATION PRESET 0.3, 0.5, 0.7, 1.0 |
| ANALOG CINE ANGIOGRAPHY VERIFICATION | 525 INT 30FPS OR 263 PPR 60 FPS | OFF | VERIFICATION PRESET 1 OF 16 LEVELS | VERIFICATION PRESET 1 OF 256 LEVELS | PRESET OFF | N/A | LINE LOCK | NO FILTER SELECTED | VERIFICATION PRESET 0.3, 0.5, 0.7, 1.0 |
| DIGITAL FLUOROSCOPY (DAS POSITION) | 525 PROGRESSIVE 30FPS | ON | N/A | DAS PRESET 1 OF 64 LEVELS | PRESET OFF | N/A | LINE LOCK | 5.0 MHz. LOW PASS FILTER | 1.0 |
| DIGITAL RADIOGRAPHY (DAS ACQUISITION) | 525 PPR 30FPS 263 PPR 60 FPS 1050 PPR 7.5 FPS | OFF | DAS PRESET 1 OF 16 LEVELS | DAS PRESET 1 OF 64 LEVELS | DAS PRESET TYP. ON | DAS PRESET 1 OF 4 LEVELS | LINE LOCK | 5.0 MHz LPF 3.0 MHT LPF FOR 1050 LINE | 1.0 |

CAMERA OPERATING MODE SUMMARY
CAMERA PARAMETERS VS X-RAY
SYSTEM OPERATING MODES - TYPICAL SELECTIONS SHOWN

Fig. 10

TELEVISION CAMERA CONTROL IN RADIATION IMAGING

This is a continuation of application Ser. No. 050,727, filed May 15, 1987 now U.S. Pat. No. 4,802,002.

TECHNICAL FIELD

This invention relates generally to radiation imaging systems employing television in combination with several modes of analog and digital image acquisition, and relates particularly to apparatus, circuitry and method for improved television camera operating parameter control, especially during the verification by the television system of analog image acquisition.

BACKGROUND ART

Medical diagnostic radiation imaging systems employing multiple modes of image acquisition are well known in the art. Such systems employ a source of penetrative radiation, such as x-rays, for propagating the radiation along a predetermined path. An image intensifier tube is interposed in the radiation path, and spaced from the source so that a patient or subject can be placed between the source and tube. The intensifier tube has an input face, and apparatus and circuitry for producing at a smaller output face, a visible image of a pattern of penetrative radiation incident on the input face.

Apparatus and circuitry is provided for producing images of the input radiation pattern in a variety of ways. One such apparatus is a spot film device, which includes means for supporting a piece of phosphor screen and light sensitive film between the patient and the input face of the intensifier tube. When an exposure is made, the pattern of x-rays emergent from the patient exposes the film, and some of the energy passes along to the input face of the intensifier tube which substantially simultaneously produces a visible image, at its output face, of the radiation pattern which also exposed the film.

Downstream from the output face of the image tube is a well known device, often called an "optical cube", which divides light energy from the visible light image into several components, each component, in some versions of equipment, directed along its own separate path, exiting the optical cube through one or more selectable "ports." Viewing one of these ports is a spot film camera, which is a camera containing film sensitive to the visible light, for making a film record of the image appearing at the output face of the image tube. Viewing another port is interposed a cine camera which includes means for exposing light sensitive motion picture film to make, over a period of time, a "movie" of the image at the image tube output.

The forms of image acquisition apparatus associated with operation of the spot film device, the spot film camera, and the cine camera result in the acquisition of an image in analog form, i.e., on film. Differing radiation intensities and exposure times are used in acquiring these film images. Such analogically acquired film images are not viewable in real time. Accordingly, a technician or radiologist operating the system in such a mode has, without other provision, no way of knowing immediately whether the exposure from which the image was acquired was appropriate in intensity and exposure time to cause the acquisition of a good analog image.

Viewing still another port is interposed a television camera for receiving a continuous light image of the image tube output. The television camera includes circuitry for scanning a target at a predetermined one of several scan rates, and for producing a video signal defining the brightness pattern of the viewed image tube output image, and also for producing appropriate synchronization signals which, along with the video signal, form an ensemble for producing on a video monitor a television image of the viewed output, in a scan format determined by the synchronization signals.

The video signal is also directed to a complex component known as a "digital acquisition system". The digital acquisition system includes means for digitizing the video, and subsequently storing and operating upon the digital data, in order to produce, at another monitor, an enhanced visible image corresponding to the stored digital data.

The television system also includes apparatus and circuitry for defining an adjustable set of television camera operating parameters, such as iris opening, scan rate, scan mode (interlaced or sequential) AGC, video gain, bias light, line lock, filter mode, and gamma.

The television camera in the system has three general uses. First, in digital image acquisition operating modes, the television camera provides the analog video signal to be digitized, stored and processed by the digital acquisition system. Secondly, the television camera, in a fluoroscopic mode, is used to produce at its associated monitor a continuous (real time) television picture of the image tube output, a particular form of analog image acquisition. Thirdly, the television camera can be used in what is known as "analog verification" mode. In analog verification mode, the image produced by the television camera at its monitor is not intended as the prime image to be studied. Rather, the television camera in this analog verification mode is used to produce a real time image. This image is useful in verifying that a proper radiation exposure, or series of exposures, has taken place, where the prime mode is the acquisition of an analog image by means of a device e.g., spot film device, spot film camera, cine camera, which is not itself capable of producing a real time image. The non-real time image consequently cannot be viewed without the aid of the instantaneously operable television chain.

Examples of prior art multimode radiation imaging camera systems similar to that described above are: Models Beta IIIA and Beta IV, manufactured by Picker International of Cleveland, Ohio, U.S.A.; Model 4112, manufactured by ADAC Inc., of San Jose, California, U.S.A.

Prior art systems have included digital storage means associated with the digital acquisition system for storing sets of representations of television camera operating parameters. The storage has been by means of software programs.

The digital acquisition system is capable of digital operation in a number of modes. In response to the selection of a digital mode of operation, the stored program controls the television camera to establish a particular set of operating parameters for the camera which are deemed appropriate for the particular digital mode selected.

This means of camera control, however, has no connection with analog image acquisition operation modes. As mentioned above, different analog image acquisition modes incorporate differing intensities and durations of x-ray exposure. Prior art television cameras have no facility for adjusting camera operating parameters to tailor the camera response optimally to the intensity and duration of exposure utilized in acquiring images in the various analog acquisition prime study modes. As a result, the television images generated in connection with operation of the television camera for analog verification are not explicitly tailored for each analog acquisition prime mode. Rather, the camera parameters have been set at fixed values which are deemed to be the best compromise for all the analog modes. Consequently, the analog verification images produced by the television camera at its associated monitor have been less than optimal in their characteristics, rendering more difficult and uncertain the important function of analog verification itself.

For example, sometimes the image is excessively faint, and at other times it is excessively bright and/or "contrasty". Sometimes, the compromise-selected scan rate employed by the television camera is too slow to produce a pleasing and useful image for verification.

Regarding the prior art adjustment of camera parameters in the digital mode, it sometimes is advantageous to alter the camera parameters which are stored in the software program and which are used to accommodate the camera to various digital procedures. This condition can result, sometimes from variations among different patients, or variations in the nature of the study performed. The prior art system is capable of alteration of these stored parameters only by reprogramming the digital acquisition system. This entails the services of a computer technician, and sometimes results in the need to remove the camera and the data storage means entirely to a remote service center for reprogramming. Also, this condition inhibits flexibility in being able to "fine tune" the system on the site by the actual technician or radiologist using the system.

As mentioned above, one of the parameters adjusted in the television camera operation is the scan rate. In some studies, the scan rate can be quite slow. In such instances, when the scan rate is slow, the image produced at the television camera monitor can become rather unpleasant to view, due to excessive "flicker" and/or long periods of darkness on the screen between successive images. Also, images acquired at slow scan rates are not particularly useful for any purpose.

It is an object of this invention to provide means for control of a television camera in a multi-mode radiation imaging system to tailor the camera response optimally for analog verification of each of a number of prime analog study modes, as well as to provide on site flexibility in adjustment of stored representations of camera operating parameter decisions for application to the camera in response to a selection of a predetermined operating mode, and to compensate system operation for slow scan rates when used.

DISCLOSURE OF INVENTION

These and other disadvantages of the prior art are reduced or eliminated by an x-ray television medical diagnostic imaging system and method, the system comprising a source for propagating x-rays along a path and through a subject. An imaging device is spaced from the source for positioning in the path, and responds to x-ray energy to produce a substantially real time visible light image corresponding to the incident radiation. Analog image acquisition apparatus is provided, including means for acquiring an analog image corresponding to the radiation in at least one of a predetermined plurality of analog operating prime study modes. Means is coupled to the analog image acquisition apparatus for selecting at least one of the analog prime study modes. Means is also provided for viewing the real time image substantially during the radiation exposure causing the actual acquisition of the analog image, to verify the proper acquisition of the analog image. The viewing means includes a television camera having circuitry and apparatus for defining an adjustable set of camera operating parameters. The system further comprises means for adjusting at least one of the set of operating parameters as a function of the selection of prime analog image acquisition modes.

This system thus facilitates optimization of television camera operating parameters during analog image verification operation of the television camera, so that the cameras operation can be tailored to the particular type of analog prime study mode being conducted, and to the particular intensity and duration of radiation exposure utilized in the analog prime study mode. The television camera thus produces the best possible analog verification image, compensating for differences in radiation intensity and exposure among the various analog prime study modes.

In accordance with a specific embodiment, the various components for performing analog prime study mode image acquisition include a spot film camera, a spot film device, and a cine camera.

Another aspect of the invention is embodied by a medical diagnostic television imaging system comprising a source for propagating x-rays along a path and an image intensifier spaced from the source and interposable in the path. A video camera is positioned to view the visible light image produced by the intensifier. The camera has a target and means for scanning the target for producing a video signal representing a viewed portion of the visible light image, along with appropriate synchronization signals. A monitor is coupled to receive the video and synchronization signals for producing a television image corresponding to the visible light image. Means is associated with the video camera for controlling the video camera to scan at a selected one of a plurality of scan rates. Circuitry is also provided coupled to the camera and to the scanning rate control means for suppressing the video signal in response to the selection of at least one of the predetermined scan rates.

This feature of the invention prevents generation of the television image on the monitor whenever a scan rate is selected which would be too slow or otherwise unsuited to provide a television image which would be either useful or pleasing to view, such as due to excessive "flicker", or extensive periods of dark screen condition between successive images.

When the television image is so suppressed, other means is used to record the output of the video camera, such as various on line storage means, so that the analog image obtained by the television camera can be eventually viewed for verification or other purpose. In any event, the system provides that, whenever, because of the scan rate selected for a prime study, the real time video image would be unpleasant to view or of only marginal usefulness, the video signals to the monitor are temporarily suppressed during the selection of that scan rate.

In accordance with a more specific feature, the system further comprises means for maintaining transmission of the synchronization signals to the monitor even during suppression of the video signal.

An advantage of this feature is that, even though the video signal may be suppressed during selection of a particular scan rate, the constant application of the synchronization signals enables the virtually instantaneous reestablishment of the image when there is selected a scan rate at which a pleasing and useful video picture can be obtained.

Another embodiment of the invention comprises a multi-mode radiation imaging television system including a radiation source, and image acquisition means for acquiring representation of an image of radiation in accordance with a selected one of a plurality of operating modes. A video system includes a video camera adapted to produce a representation of a second image corresponding to the acquired image in response to the radiation, the camera including apparatus and circuitry for defining a plurality of adjustable camera operating parameters. Means is provided for storing sets of representations of video camera operating parameters, each set corresponding to one of said operating modes. Additional means is provided for adjusting the camera by use of a stored set of parameter representations for a predetermined one of the operating modes, in response to the selection of that mode for system operation.

This embodiment provides for television camera control in a radiation imaging environment to facilitate provision of versitility in camera operation, by providing a group of sets of stored camera parameters, and for automatically adjusting the camera to a predetermined optimized set of parameters represented by the stored set, in order that camera operation may be optimized for the given one of the operating modes which is selected.

In accordance with a more specific embodiment, the storage means for storing the sets of operating parameters includes nonvolatile random access memory circuitry.

The provision of nonvolatile random access memory circuitry facilitates the on-site adjustment or change of values stored in the various sets of parameter representations, such that system performance can be adjusted easily by an operator at the site of operation, without need for dismantling the equipment or sending to a servicing center remote from its normal location of use.

Thus, in accordance with a more specific feature, means is provided for modifying at least some of the representations stored in the nonvolatile random access memory.

In accordance with another aspect of the invention, a digital radiation imaging system is provided having a radiation source, means for converting the radiation to a visible image, and a television camera for viewing the visible image, the camera including apparatus and circuitry defining a set of adjustable camera operating parameters. Hardware means, rather than software, is provided for storing a plurality of groups of camera operating parameter representing signals. Means is coupled to the camera for selecting one of the plurality of camera operating modes. Further means is provided for applying to the camera a group of the parameter representing signals to optimize camera operation in accordance with which of the operating modes is selected.

These and other features and advantages of the present invention will be understood in more detail from a study of the following description of the best mode for carrying out the invention, and from the drawings, in which:

BRIEF DESCRIPTION OF DRAWINGS

FIG. 10 is a table defining an aspect of operation of the system as shown in FIGS. 4 and 5.

BEST MODE FOR CARRYING OUT INVENTION

Figure 1:
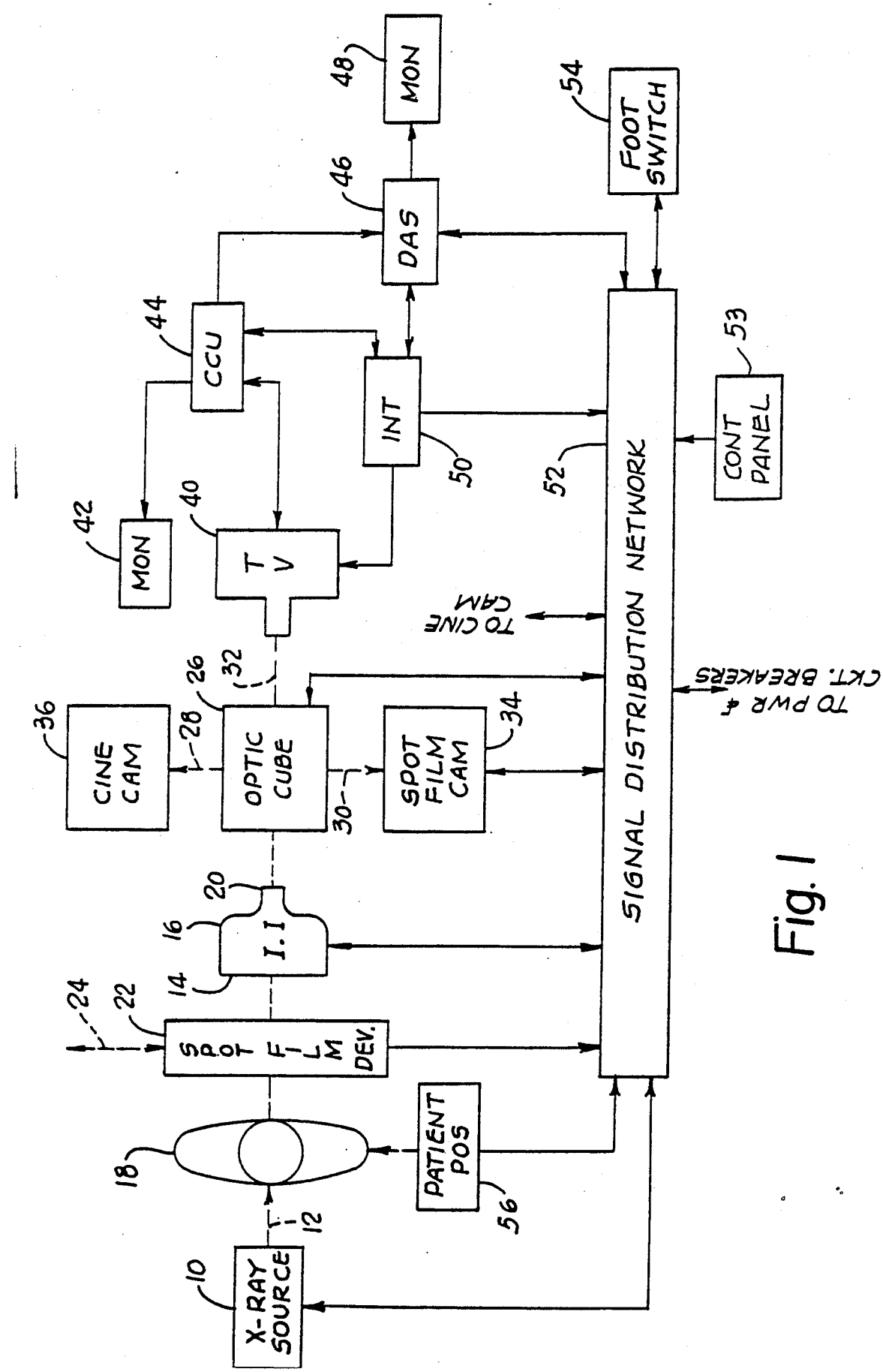
FIG. 1 is an overall block diagram of a radiation imaging system incorporating the present invention.

FIG. 1 illustrates in block form a multi-mode radiation imaging system incorporating the present invention. The system of FIG. 1 includes a source 10 for producing x-rays which are propagated along a path 12 toward an input face 14 of an image intensifier tube 16. The image tube 16 is sufficiently spaced from the source 10 to accommodate the location therebetween of a patient or subject 18. X-rays from the source pass through the patient and the emergent pattern is incident upon the input face 14 of the image tube 16. The image tube 16, of known variety, produces at an output face 20 a visible light image corresponding to the pattern of x-rays incident upon its input face 14.

The FIG. 1 system includes various apparatus and circuitry for producing representations of the x-rays passing through the patient in accordance with a variety of operating modes.

One such apparatus is a spot film device 22. The spot film device 22 is movably interposable in the radiation path 12 between the patient and the image tube input face. As shown in FIG. 1, the spot film device is supported for movement into and out of the path 12 in the directions indicated by the arrows 24. The spot film device is mechanically coupled to the image tube, and to cine, spot film and television cameras, and to an optical cube (all described below) for movement in unison with these components.

The spot film device 22 includes apparatus for supporting a portion of x-ray sensitive phosphor screen and light sensitive film in a cassette between the patient and the image tube. The x-ray pattern emergent from the patient exposes the film, and some of the energy passes through the film. The exposed film can then be developed in order to produce a radiographic film image of the pattern of x-rays which pass through the patient's body.

The x-ray energy passing through the radiographic film and cassette then falls upon the input face 14 of the image tube, which produces at its output face 20 a visible light image corresponding to that x-ray pattern.

Downstream from the image tube output face 20, a beam splitter, sometimes called an "optical cube" 26 is provided to receive the output face image. The optical cube includes means for splitting light energy from the output face 20 among a selected one or more ports, the light passage from three ports being indicated as 28, 30, 32. The optical cube thus divides or distributes, as desired, the light energy from the output face 20 to various other image acquisition apparatus. For example, a spot film camera 34 is aligned with the path 30 from the optical cube. The film camera is positioned to expose a portion of visible light sensitive film to record the image from the image tube output face 20.

Similarly, a cine camera 36 is aligned with the path 28 and is capable of making "movies" of the continuous image at the output face 20, where desired.

A television camera head 40 is aligned with the path 32, and also views the light image from the output face 20 when the optical cube is set up to deliver that light to the television camera.

The television camera 40 includes a target, an electron gun, and circuitry and apparatus for causing the beam of electrons from the gun to scan the target at any of a predetermined number of scan rates, and field scanning modes, such as interlaced and sequential. The television camera also includes adjustable gamma, iris and other settings, which will be discussed in more detail below.

The television camera 40 is a television camera head, and includes preamplification and sweep generator, yoke, camera tube, lens, and an iris in front of the lens. The camera head is embodied by a catalog No. 4338A-G, made by Picker International, of Cleveland, Ohio, U.S.A.

The television camera 40 performs several different functions, which will be described in more detail below. One such function is that of a fluoro device. In the fluoro mode, the television camera receives light output from the output face 20 of the image tube, and produces a video signal representing the light distribution of the viewed image, along with appropriate synchronization signals. The video and synchronization signals are directed to a monitor 42 via a camera control unit 44 and produce on its face a visible continuous image of the output image of the tube 16.

It is significant to note that the spot film device, spot film camera, and cine camera do not produce real time images. Rather, these devices produce exposures on film, which cannot be immediately viewed, but rather can only be viewed after the film is processed. Only the television camera 40, operating in conjunction with its monitor 42, in conjunction with the image tube 16, can produce a real time image corresponding to that appearing at the output face 20 of the image tube.

Acquisition of analog images by operation of the spot film device, the spot film camera, and the cine camera is known as operation in "prime" analog study modes, where the acquired information, in the form of exposed film, is used to later produce the actual image which will be primarily utilized by a radiologist in evaluating a medical diagnostic study.

The requirements for proper exposure of film in the spot film device, spot film camera and cine camera can differ. Therefore, the radiation exposures utilized with these respective analog image acquisition prime study modes can differ in both intensity and duration.

The capability of the television camera 40, in conjunction with its monitor 42, to produce a real time image corresponding to that of the output face 20 of the image tube, gives rise to a second function of the television camera, i.e., that of "analog verification". Analog verification is the use of the television camera and its monitor to produce a real time image of the output face 20 simultaneously with the radiation exposure, when a prime analog study mode is conducted with a nonreal time imaging device, such as the spot film device, the spot film camera or the cine camera. A technician or radiologist conducting the prime analog image acquisition study can view the monitor 42 during the exposure, and evaluate the image produced to help in making an immediate determination whether the actual exposure of radiation is appropriate for the conduct of that particular selected analog prime study mode.

A significant feature of the present invention is the provision of apparatus and circuitry, responsive to the selection of a particular analog prime study mode, to optimize television camera operating parameters specifically for that selected analog prime study mode. The apparatus and circuitry for implementing this technique is discussed in more detail below.

A third function of the television camera 40 is to provide an input, corresponding to the viewed image of the output face 20, for implementing various digital image acquisition modes different from the analog modes. In implementing this function, video and synchronization signals are directed to a camera control unit 44 and subsequently to a digital acquisition system 46. The digital acquisition system 46 is a model DAS 211 System 3, manufactured by ADAC Inc., of San Jose, Calif., USA.

The digital acquisition system 46 converts the analog video signal to a train of digital signals which are input to a computer control in the digital acquisition system. The computer control of the system 46 inputs the digitized information to a storage means, from which it is retrieved and operated upon in known ways in order to enhance the digitally represented image. Such image enhancement procedures include digital subtraction studies, roaming and zooming about the image, filtering functions, and masking.

A second monitor 48 is coupled to the digital acquisition system 46, and operates, in conjunction with a digital to analog converter in the digital acquisition system, to produce an analog image corresponding to one or another digital image representations produced by the digital acquisition system 46.

The particulars of the known digital acquisition system do not form a part of this invention, and hence the digital acquisition system 46 is discuss here only generally.

Communication and control functions between the television camera 40 and digital acquisition system 46 are performed by the camera control unit 44 and by an interface system 50. The construction and operation of the camera control unit and the interface system will be described in more detail below.

A signal distribution network 52 is also provided for transmitting signals among the various components of the system of FIG. 1 in order to establish proper coordination between and among those components. The signal distribution network 52 receives signals from, and transmits signals to, the digital acquisition system 46. The distribution network 52 also receives command signals from a control panel 53, and from a foot switch 54, used for actuating the system for operation in one or more selected modes. The signal distribution network 52 also transmits power, where needed, to drive the various components. The signal distribution network is a network of bus circuitry of known design which can be provided by those of ordinary skill in the art, and which is a common component of prior art multimode radiation imaging systems, such as system Models Beta IIIA and Beta IV manufactured by Picker International of Cleveland, Ohio, USA.

The signal distribution network 52, as shown in FIG. 1, directs signals to and from the x-ray source, a patient position mechanism 56, the foot switch, power sources for the various components, circuit breakers, the digital acquisition system, the film and cine cameras, the optical cube, and the image intensifier tube. These signals are of known type and are incorporated, for example, in the prior art systems Models Beta IIIA and Beta IV, referred to above.

Figure 2:
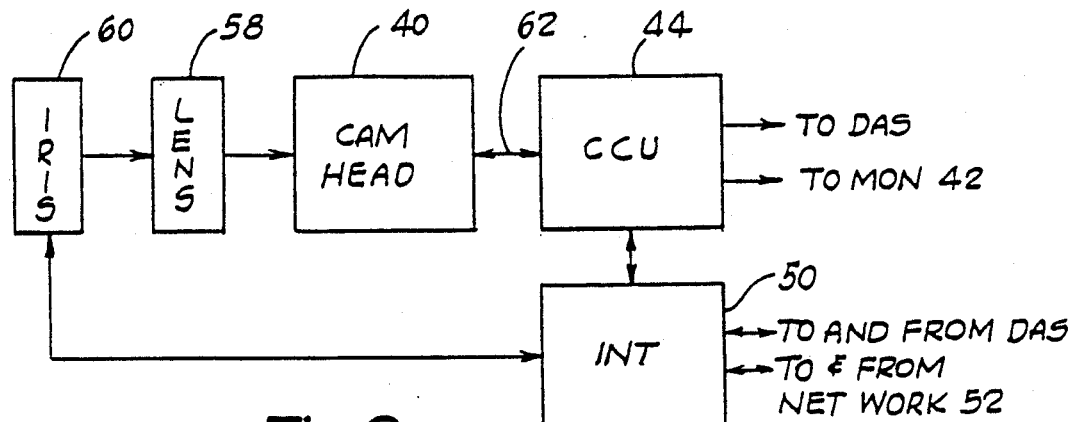
FIG. 2 is a detailed block diagram illustrating a portion of the system shown in FIG. 1.

FIG. 2 is a more detailed block diagram illustrating the camera head 40, with its associated lens component 58 and iris component 60. Also illustrated are the camera control unit 44 and the interface 50, with their associated connections to other system components.

The double ended lead 62 is represented as a single line for the purposes of simplicity, but it is to be understood that the lead 62 is a set of leads and carries a multitude of different signals for implementing control functions in the television camera. The lead set 62 delivers electric power to operate the camera head. It also carries the command signals dictating the various camera control voltages, such as four grid voltages, the target voltage, horizontal and vertical drive voltages for cathode blanking, and yoke control. Yoke control includes vertical sweep control, horizontal sweep control, alignment control and control of a focusing coil which is part of the camera head.

A component of the lead set 62 delivers the video signal from the camera head (a pure video signal).

Figure 3:
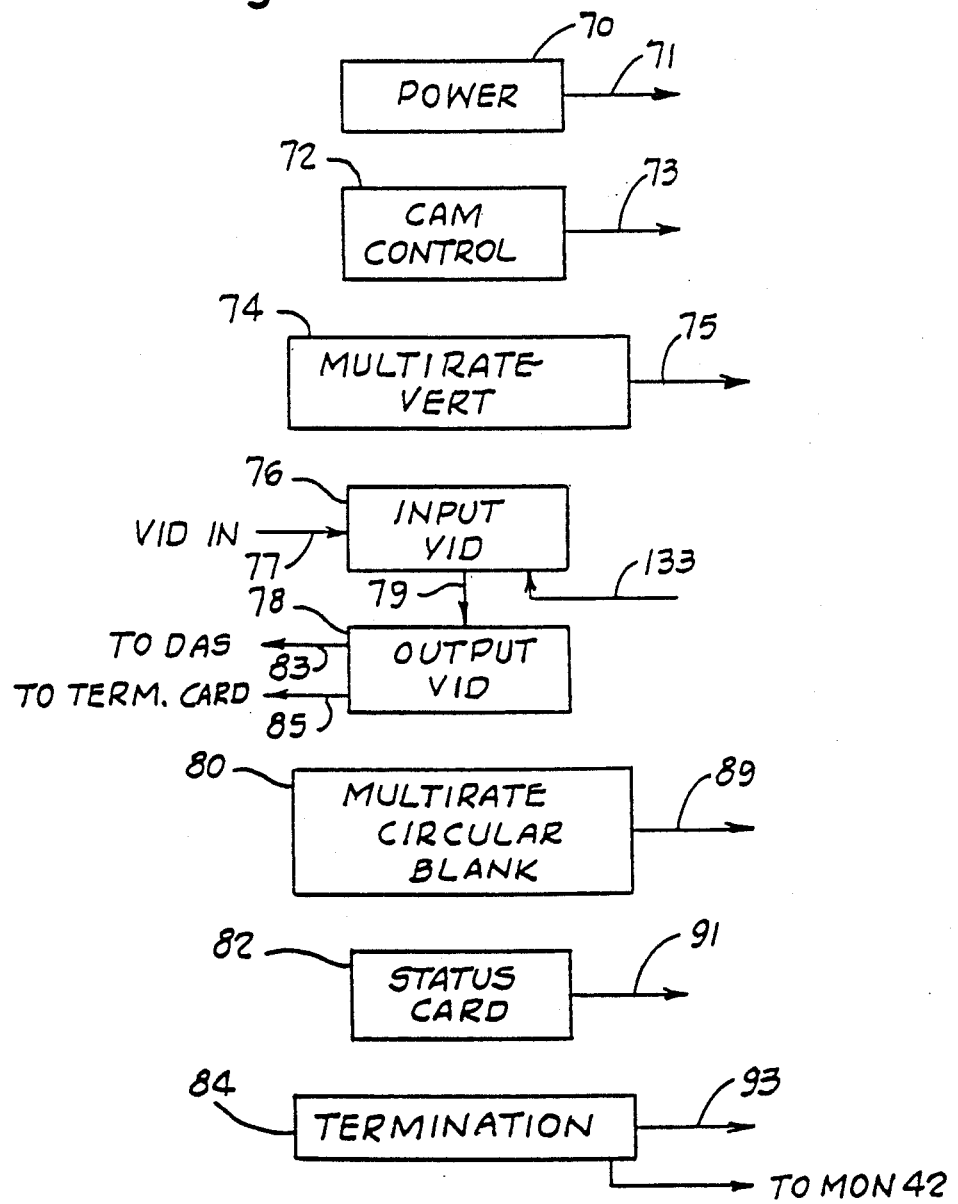
FIG. 3 is a block diagram of a component of the system of FIG. 1.

FIG. 3 illustrates in block form the components of the camera control unit (CCU) 44. The camera control unit 44 comprises a chassis on which is mounted a plurality of individual circuit cards for performing various functions.

As shown in FIG. 3, the CCU 44 comprises the following cards: a power supply 70; a camera control card 72; a multi-rate vertical card 74; an input video card 76; an output video card 78; a multi-rate circular blank card 80; a status card 82, and a termination card 84. Each of these cards, except for the power supply, receives an input or inputs from the interface component 50 and, in response, produces an output command signal or signals to control one or more of the operating parameters of the television camera head 40. For purposes of simplicity in FIG. 3, however, the inputs to the cards from the interface component are not illustrated. These are discussed in more detail below. Rather, only the outputs are shown.

The power supply 70 produces at a lead set 71 power to energize the camera.

The camera control card 72, in response to an input from the interface, produces at a set of leads 73 signals controlling camera tube control voltages and focus.

The multi-rate vertical card 74, in response to an input from the interface, produces at a set of output leads 75 signals controlling the vertical sweep and horizontal sweep of the television camera.

The cards constitute the CCU 44 and comprise known types of decoding and amplification circuitry responsive to inputs from the interface to produce predetermined patterns and amplitudes of output signals for implementing the control functions discussed in connection with these cards.

The input video card 76 receives the video signal from the television camera on a lead 77. The video input card also receives signals from the interface representing commands for the establishment of particular gain control amplifier, filtration, attenuation, automatic gain control and automatic brightness control functions of the camera.

The video signal is transmitted from the input video card to the output video card 78 by way of the lead 79. The video signal is then transmitted to the digital acquisition system (DAS) 46 over a lead 83 and to the monitor 42 by way of a lead 85 through the termination card 84.

Additionally, the output video card, in response to input signals from the interface, controls the gamma function, i.e., selective emphasis of low level video, of the camera 40, and for controlling the synchronization, blanking, mixing and line drive camera functions.

The multi-rate circular blanking card 80, in response to input from the interface 50, produces at a set of leads 89, a group of signals for causing the camera to produce the circular output image, i.e., masking the area outside a circular output of the image tube, so that the television camera does not image what it "sees" outside the image tube output face 20.

The status card 82, in response to input from the interface, produces, at a set of leads 91, signals for actuating indicators (not shown) for providing an operator a tangible indication of the mode of operation selected for the radiation imaging system.

The termination card 84, in response to input from the interface, provides, via a set of leads 93, the terminating resistances for the various drives in the television camera.

The camera control unit 44 is a Catalog No. 74233A-D, manufactured by Picker International, of Cleveland, Ohio, U.S.A.

Figure 4:
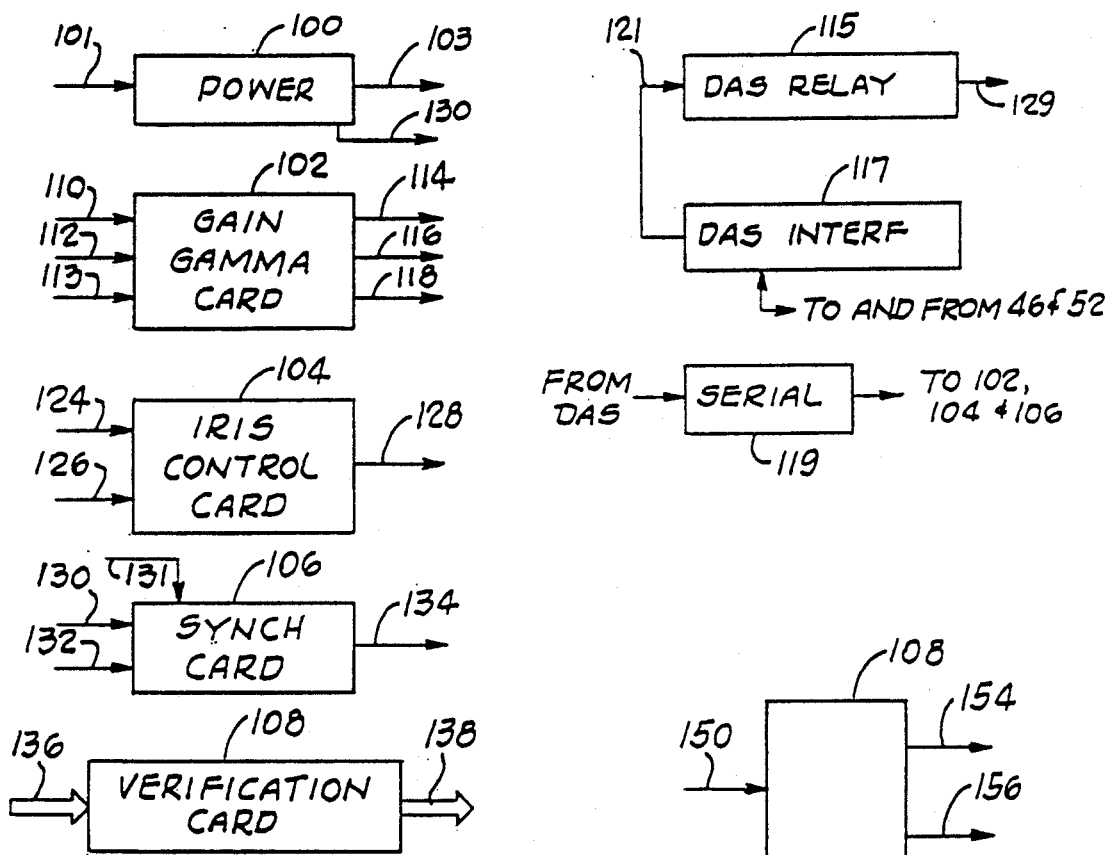
FIG. 4 is a block diagram of another component of the system of FIG. 1.

The interface 50 is illustrated in block form in FIG. 4. The interface 50 comprises a chassis bearing several circuit cards, similar in general construction to the CCU 44. The interface 50 comprises the following cards: a power supply card 100; a gain gamma card 102; an iris control card 104; a synchronization card 106; a verification card 108; a DAS relay card 115; a DAS interface card 117, and a serial interface card 119.

It is important to understand that the verification card 108 and the serial card 119 have parallel functions. Each of these two cards provides a set of outputs that control television camera operating parameters, as are described in detail below. Both cards produce the same set of parallel outputs, but only one of the two cards applies its outputs to control the television camera at any given time.

More specifically, the verification card 108 controls the camera only when an analog study mode is selected. The serial card controls the camera only when a digital mode is selected.

The serial card is in turn controlled in known fashion by software in the DAS 46. When a digital operating mode is selected, control of the camera is by the DAS 46, and the outputs of the verification card are disabled.

The verification card 108 is controlled by external mode selection circuitry, which appears as input 152 to the verification card. When the verification card 108 is in control, the control outputs of the serial card 119 are disabled.

The interface 50, and its associated cards, transmit various command inputs to the CCU 44 received from the digital acquisition system (DAS) 46, and from an external control panel 53 via signal distribution network 52. The power supply 100 receives an input over a lead 101 from a main actuating switch (not shown), and produces a power signal over an output lead 103 to energize the interface 50 similarly as described in connection with operation of power supply 70 as shown in FIG. 3.

The gain gamma card 102 receives the following inputs: a 4 bit digital signal defining the amount of gain desired, over a lead set 110; a 2 bit digital signal defining the gamma setting, over a lead set 112, and a 2 bit digital signal, over a lead set 113, indicating the mode of camera filtration desired. These inputs come from a preselected one of the DAS serial card 119, and the verification card 108, (depending on whether a digital or analog study, respectively, is selected) and as described in more detail below.

The gain gamma card 102 produces the following outputs: a 2 bit digital output, over a set of leads 114, representing a command for the selection of a particular mode of filtering, selected from among three modes, i.e., no filtering, and low pass filtering at either 5 MHz or 3 MHz, this output being directed to the input video card. The gain gamma card 102 also produces, over a lead 116, a DC analog signal, directed to the input video card of FIG. 3, indicating desired gain for the television camera 40. The gain gamma card also directs to the output video card a 2 bit digital signal specifying the gamma level desired (0.3, 0.5, 0.7, or 1.0), appearing at a lead set 118.

The iris control card 104 receives from the DAS serial card 119 or the verification card 108, depending on whether a digital or analog mode, respectively, is selected, a 6 bit digital signal, over a lead set 124, indicating desired iris opening for the television camera. The iris control card produces, at a lead 128, an analog voltage, directed to the iris, for determining the degree of iris opening. The analog voltage ranges from 1 to 8 volts. The iris control card 104 also receives from the iris, over a lead 126, a "ready" signal which is produced by the iris in known fashion when the iris opening stabilizes at proper aperture.

The synchronization card 106 receives a line reference signal over a lead 130 from the power supply 100. The synchronization card also receives a 4 bit digital signal from the DAS 46 or from the verification card 108, (depending on whether a digital or analog study mode, respectively, is being executed) which defines which of a plurality of synchronization modes is to be used. The synchronization card directs to the camera 40, over a set of leads 134, outputs controlling the horizontal, vertical, mixed video blank and mixed synchronization functions.

The verification card 108 is illustrated in FIG. 4 in simplified form, as having a set of inputs 136 and a series of outputs 138. The input set 136 corresponds to the lead sets 150, 152 of FIGS. 5 and 6. The output set 138 corresponds to the lead sets 154, 156, 158, 160, 162, 164, 166, 168, 170 of FIGS. 5-8, all of which are explained in detail below. The verification card 108 is instrumental in providing the television camera 40 with optimization of its operating parameters during its use in analog verification of other analog prime study modes. The verification card also embodies the implementation of on-site programmability of camera parameter representations stored in the system. Accordingly, the verification card is described in more detail below.

The DAS relay card 115 produces signals for sequencing the operation of the system when operating in a digital study mode, during which time the system is under the control of the DAS. This card receives a 2 bit digital input signal at a lead set 121, from the DAS interface card 117, discussed in more detail below. Outputs from the card 115 are directed to the signal distribution network 52 and to the DAS. The card 115 comprises relay-type logic for responding to the DAS to sequence system operation. The signals output (over a lead set 129) from the DAS relay card 115 include signals back to the DAS indicating that certain system components are "ready"; signals controlling the optical cube, and for actuating an injection to administer radiopaque dye to a patient in synchronism with system operations.

The DAS interface card 117 has both inputs and outputs to and from the DAS 46 and to and from the signal distribution network 52. The function of this card is to provide both isolation and interface between the DAS and the rest of the system, and to provide for interlocks.

The serial interface card 119 couples the DAS 46 to the TV camera 40 via interface 50. The serial interface card receives serially controlled words from the DAS and produces a set of outputs to control the camera operating parameters discussed above, when the system is operating in a digital mode, i.e., under control of the DAS.

The DAS relay card 115, the DAS interface card 117 and the serial card 119 are known in the art, an example being the above mentioned camera system made by ADAC, Inc.

The camera 40, lens 58, iris 60, camera control unit 44 and interface 50 are embodied in a system, catalog No. 6599, and designated "BETA X", manufactured by Picker International, Cleveland, Ohio, U.S.A. The interface 50 is a catalog No. 353035A or B, manufactured by the aforesaid Picker International.

Figure 5:
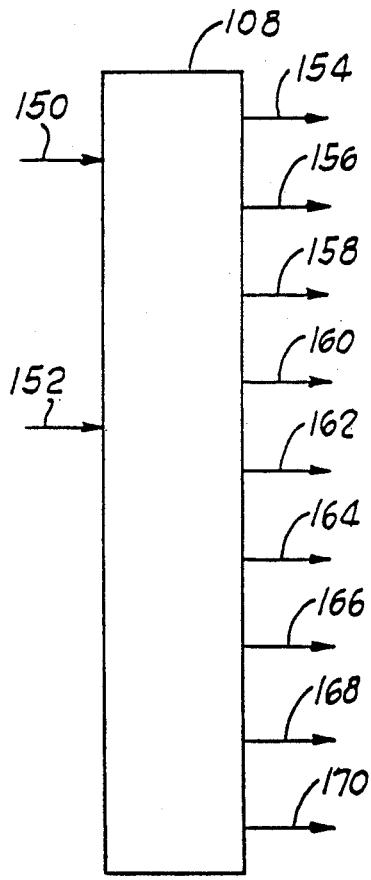
FIG. 5 is a block diagram of a portion of the component shown in FIG. 4.

FIG. 5 is a detailed drawing functionally illustrating the verification card 108. The verification card 108 has two inputs, appearing at lead sets 150, 152. The verification card has nine outputs, appearing at the lead sets 154, 156, 158, 160, 162, 164, 166, 168 and 170.

The lead 150 carries a 1 bit digital signal whose function it is to indicate whether the system operating mode is a digital one, i.e., to be selected by the digital acquisition system 46, or if the mode is to be selected by an external reference, the latter being used when an analog prime study mode is desired, and the television camera is to be used in its analog verification mode. The signal at the lead 150 comes from the serial card 119, discussed above.

The lead set 152 carries a 5 bit digital operating mode select signal, which comes from the signal distribution network.

The verification card 108 comprises decoding circuitry for establishing its set of nine different outputs in accordance with the particular combination of mode select signals which are input to the verification card at the leads 150, 152.

The output signal at the lead set 154 is a 4 bit digital mode select signal which is directed to the synchronization card 106 of FIG. 4 over the lead set 132.

The output at the lead set 156 is an 8 bit digital iris control signal representing the desired iris aperture, which is directed as an input over the lead set 124 to the iris control card 104.

The output at the lead set 158 is a 4 bit digital gain select signal indicating the amount of gain required, and directed as an input over the lead set 110 to the gain gamma card 102.

The output at the lead set 160 is a 2 bit digital gamma select control, directed as an input to the gain gamma card over the lead set 112.

The output at the lead set 162 is a 2 bit digital filter level control, which is also directed as an input to the gain gamma card over the lead set 113.

The output at the lead set 164 is a 2 bit digital bias light selection signal, which is directed to the serial card 119.

The output at the lead 166 is a 1 bit bias light on/off control, also directed as an input to the serial card 119.

The output at the lead 168 is a 1 bit digital signal determining a selection of whether the television camera 40 will use synchronization based on line lock, or synchronization based on the operation of an oscillator internal to the camera. This output is also directed as an input to the synchronization card 106 over a lead 131.

The output at the lead 170 is a 1 bit digital signal indicating whether automatic gain control is to be employed or not, this signal being directed as an input to the input video card 76 over a lead 133 (See FIG. 3).

Figure 6A:
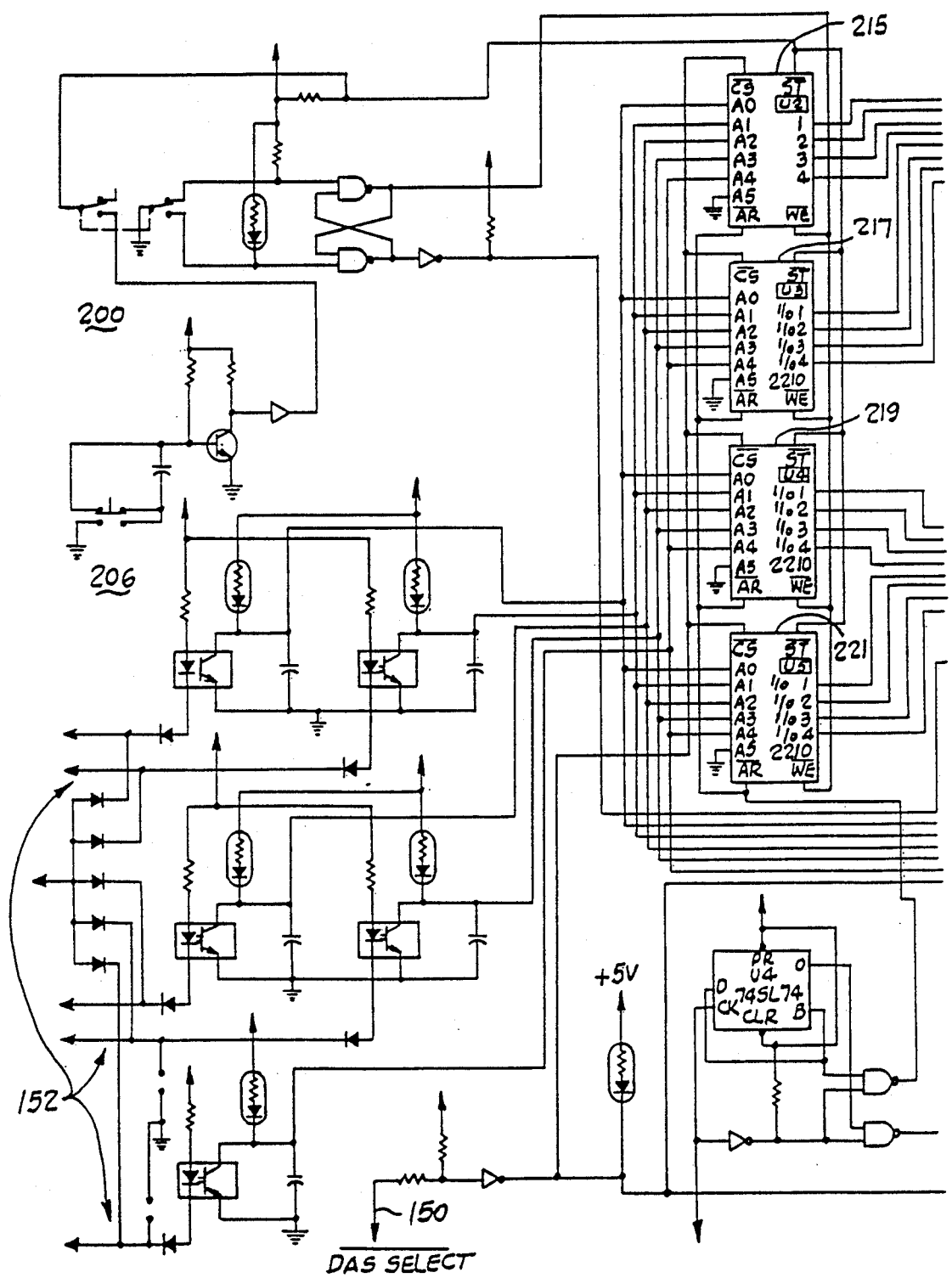
FIGS. 6a and b and 7-9 are schematic drawings of portions of the embodiment shown in FIGS. 3-5.
Figure 6B:
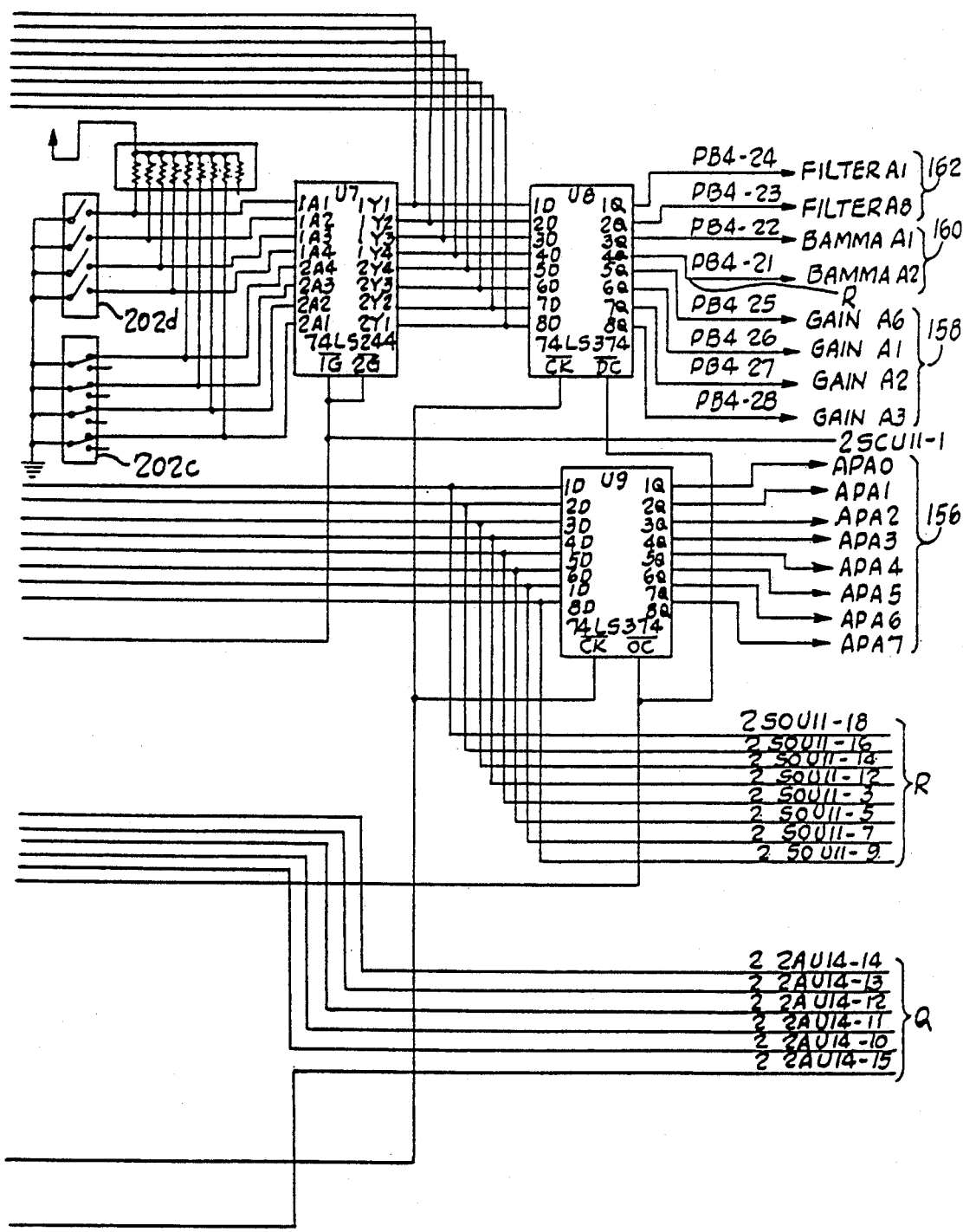
Figure 7:
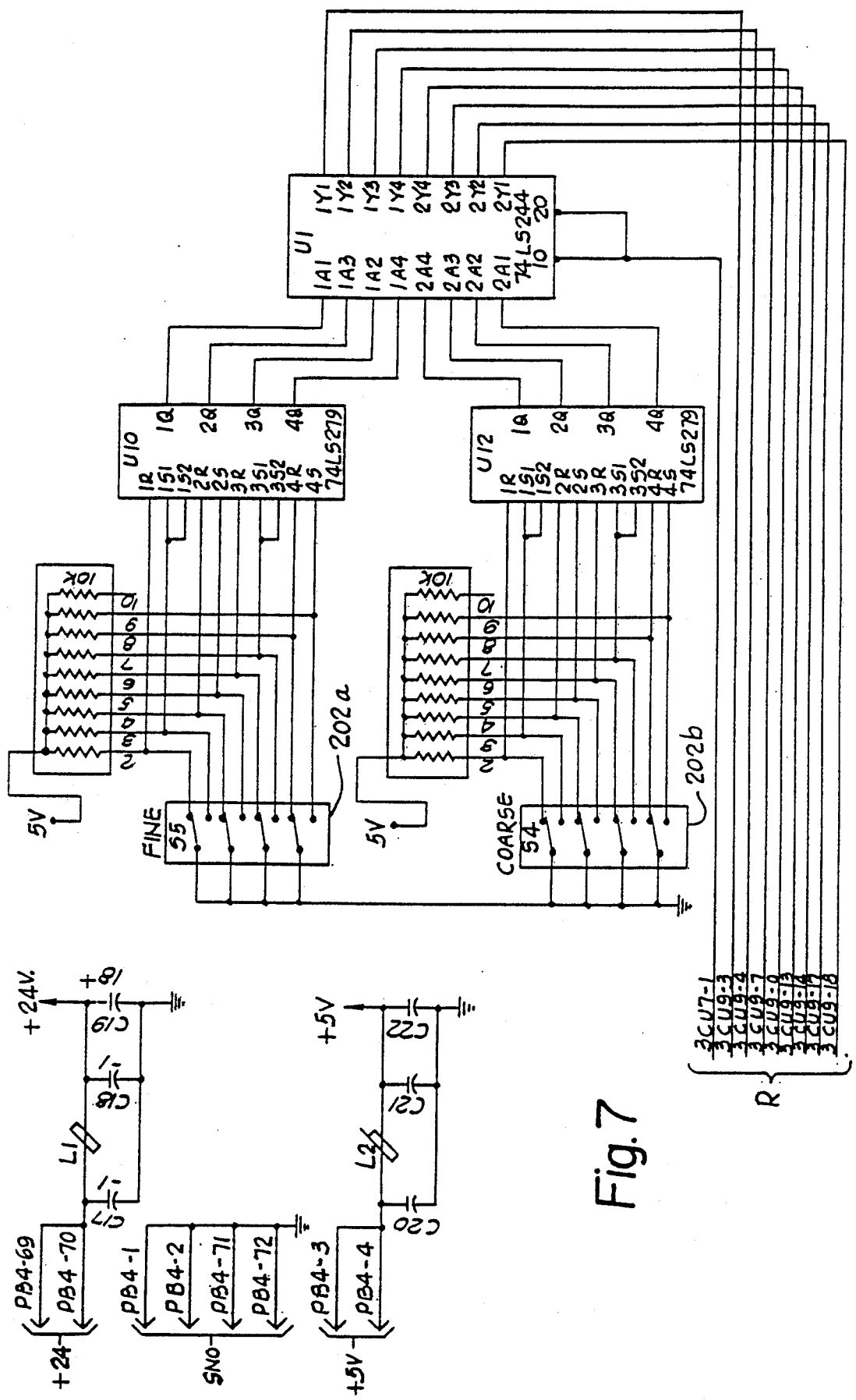
Figure 8:
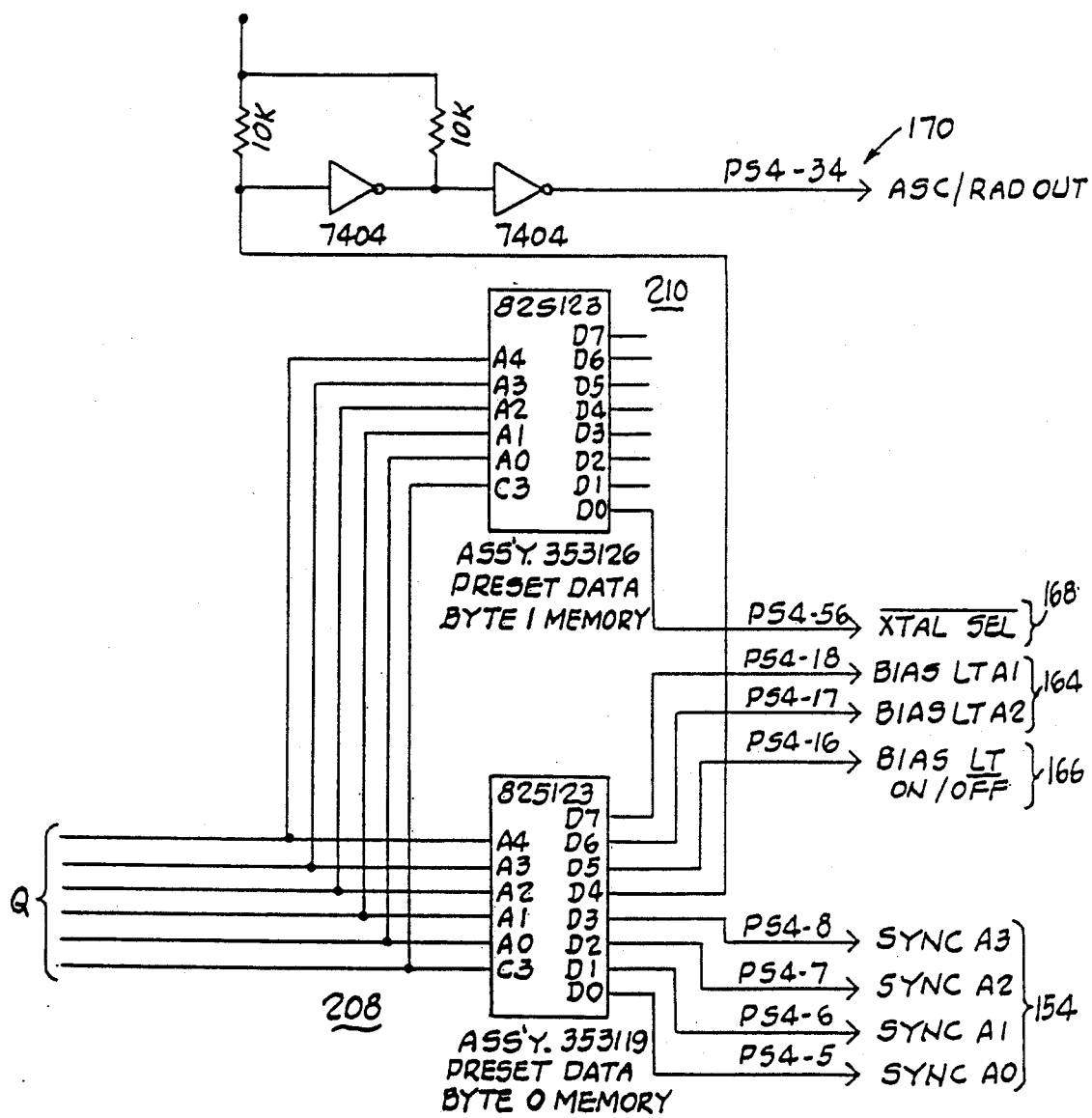

FIGS. 6–8 constitute a schematic illustration of the verification card 108. The reference characters on FIGS. 6–8 correspond to those illustrated more generally in FIG. 5.

The verification card contains the circuitry for storing sets of representations of the various television camera operating parameters each set corresponding to one of the predetermined plurality of system operating modes.

When an analog prime study mode is selected, the verification card applies the stored set of operating parameters corresponding to the selected mode to control the camera, during the performance of the study.

As mentioned above, however, when the digital acquisition system 46 is actuated, to perform a digital study, the verification card does not control camera parameters. Rather, during digital operation, the digital acquisition system 46 controls camera operating parameters in known fashion.

Referring to FIG. 6, a predetermined "operate" state of the signal at the lead 150 actuates the circuitry on the verification card to take over control of the camera operating parameters by applying a set of parameter representations to the camera, the set corresponding to the particular mode selected. The signal at the lead 150 assumes this "operate" state when an analog prime study mode is selected for the system to perform.

As mentioned in connection with FIG. 5, the particular mode to be selected is identified at the lead set 152, also shown in FIG. 6.

The mode select signal at the leads 152 addresses unique locations in storage circuitry of the verification card, which includes programmable read-only memories (PROMS) 208, 210, (FIG. 8) and a set of four non-volatile random access memory chips (NOVRAMS) 215, 217, 219 and 221 (FIG. 6).

So addressed, the storage circuitry applies data in the addressed locations (corresponding to the selected mode) to the television camera over the various leads identified in FIGS. 6–8 and corresponding to the leads generally identified in FIG. 5.

When the digital acquisition system is performing a digital study, and it is not desired for the verification card to apply the camera operating parameters, the signal at the lead 150 is changed in state, deactuating the verification card circuitry until the signal at the lead 150 is again changed to its other "operate" state.

During the time of operation of the digital acquisition system, the digital acquisition system controls the camera parameters, by means of software, in accordance with which of a plurality of digital studies is selected. This is accomplished by the use of a serial link and the serial card 119, which have outputs corresponding to those of the verification card 108.

Conversely, when the signal at the lead 150 is changed to its state actuating the verification card to control camera parameters, the outputs of the digital acquisition system serial card are disabled for as long as the verification card remains in control.

Circuitry and software for implementing camera control by the digital acquisition system is known and can be provided by one of ordinary skill in the art. The above referenced camera by ADAC, for example, incorporates the serial control interface of the digital acquisition system with the television camera.

As mentioned above, the storage circuitry of the verification card includes both NOVRAMS and PROMS. Each NOVRAM has a capacity of 64 words by 4 bits per word. A total of 16 bits of data per word is thus available.

Parameters stored in the NOVRAM circuitry are the aperture (iris), 8 bits (in NOVRAMS 219, 221); the gain, 4 bits (in NOVRAM 217); the gamma control, 2 bits, as at leads 160, and filter control, 2 bits, as at leads 162 (in NOVRAM 215).

The parameters stored in the PROMS include those represented by the outputs of the lead sets 154, 164, 166 and 168.

The verification card 108 also includes circuitry for on-site programming of the parameter representations in the NOVRAM circuits. This is done to optimize the parameter values stored in the NOVRAM circuitry, in order to tailor those values to the particular individual characteristics of the imaging components of the system.

Referring again to FIG. 6, entry to the programmed parameters stored in the NOVRAM circuitry is had by actuation of a switch 200 (FIG. 6). After actuation of the switch 200 to its "program" state, a mode designation signal is applied to the lead set 152, defining the mode for which the particular data entry to the NOVRAMS is being made.

With the switch 200 in its "program" mode, program switch banks 202a–d (FIGS. 6 and 7) are enabled to apply to a particular set of address locations in the NOVRAMS, the above stated parameter defining information for the particular mode selected and indicated by the signal combination at the lead set 152.

Switch banks 202a, 202b, 202c, and 202d are coupled to program, respectively, NOVRAMS 219, 221, 217 and 215.

Following the entry of this particular data, a "store" switch 206 (FIG. 6) is actuated, causing the NOVRAMS to store the data represented by switch banks 202a–d.

Each NOVRAM is dedicated to storage of information relating to only predetermined parameters as described above. Each NOVRAM, however, has capacity for storage of a representation of a value for its particular parameter, or parameters, for each of the plurality of selectable operating modes.

The "store" switch 206 operates all the NOVRAMS to store data in one particular mode. After completing the programming for all the NOVRAMS for one mode, the store switch 206 is actuated, and the entire procedure is subsequently repeated for the other modes, beginning with the application of each additional mode defining signal to the lead set 152, identifying the other modes for which programming is desired.

When all the desired programming has been completed in each NOVRAM for all modes, the switch 200 is then returned to its "operate" status, and the verification card is then in readiness to apply its stored sets of parameter values respectively to the television camera when actuated to do so by the signal at the lead 150, in accordance with which mode is selected by the signal pattern at the leads 152.

The parameters for which storage is provided in NOVRAM circuitry are chosen to be those parameters which are dynamic operating parameters whose values needs to be customized, each within a range, because of system optical and imaging component characteristics. It is anticipated that, usually, the programming of the NOVRAM circuitry will be done at the setup of the entire system, and that reprogramming will not be frequently required.

Figure 9:
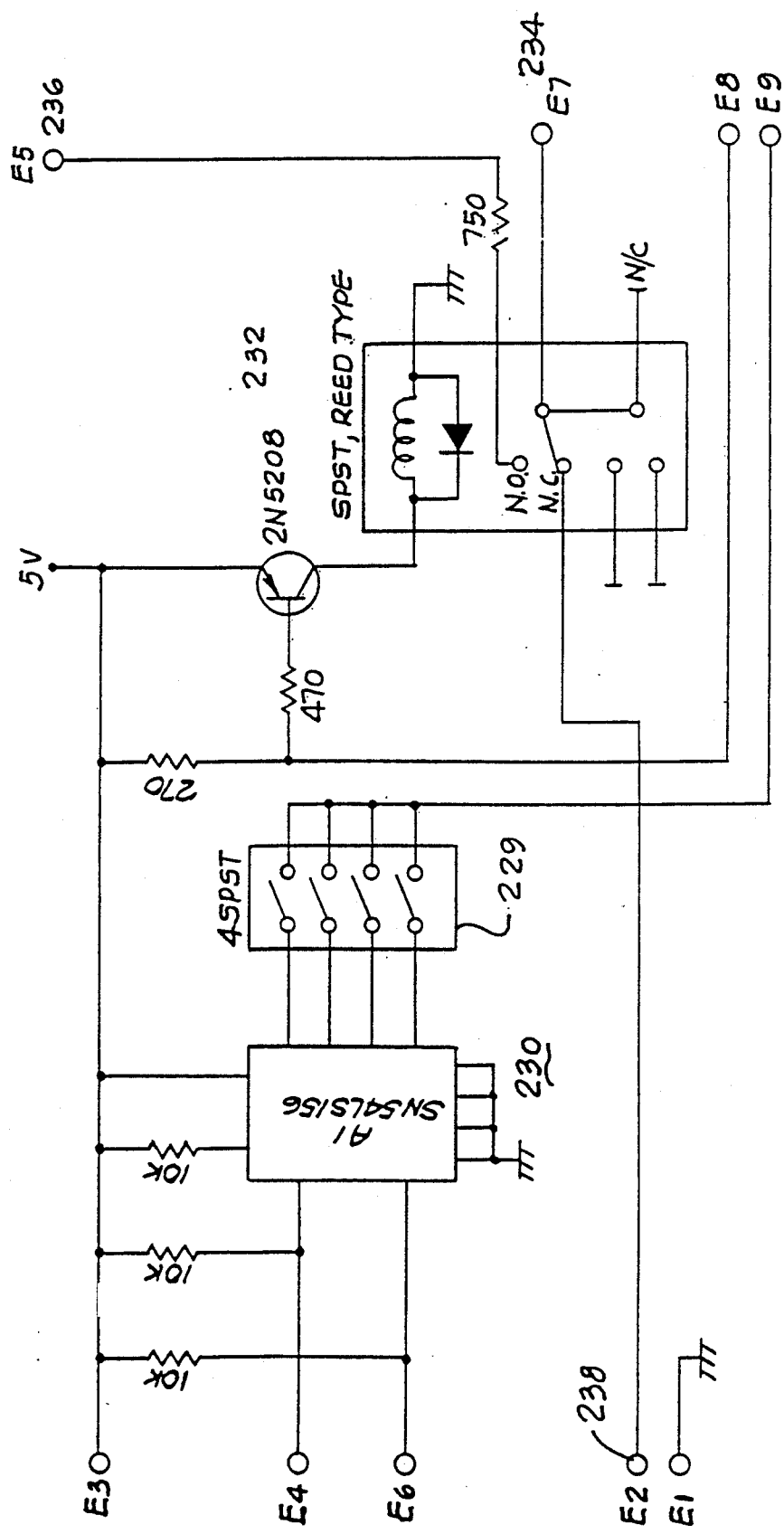

FIG. 9 is a schematic diagram illustrating circuitry for inhibiting or interrupting transmission of the video signal from the camera 40 to the monitor 42 when a predetermined one or more of a set of scan formats is selected.

By way of background, the system in which this invention is incorporated has the following four scanning formats:

A 525 line interlaced scan of 60 fields (30 frames) per second; a 525 line progressive scan, at 30 frames per second; a 263 line progressive scan, at 60 frames per second, and a 1,050 line progressive scan at 7½ frames per second.

Experience has shown that, in the 525 line progressive scan at 30 frames a second and at the 1050 line progressive scan at 7½ frames per second, the image, if reproduced on the monitor 42, has a great deal of "flicker" and is considered by many to be rather unpleasant to view.

Accordingly, the circuitry of FIG. 9 is provided in order to interrupt the video signal in response to the selection of one of the above two, slow frame rate formats.

The operation of the circuitry of FIG. 9 is programable by means of a switch 229. A decoder 230 decodes 2 bits which are indicative of the scan format selected, and are derived from the mode select signal appearing, for example, as described above, at the lead set 152. When one of the modes as to which video suppression is desired is selected, the decoder 230 causes a relay 232 to actuate. The relay 232 is a single pole, double throw switch. The relay 232 selects between the signal appearing upon a lead 238, which includes both video and synchronization signals, and another signal appearing at the lead 236, which contains synchronization, but no video. The video input is indicated at a lead 234.

For the benefit of those not intimately familiar with this art, FIG. 10 is provided. FIG. 10 is a table showing preferred values for the various television camera operating parameters versus x-ray system operating modes. These values are established, in analog verification mode. In digital mode, they are controlled by the DAS, by way of the serial interface card 119, which provides substantially the same outputs as the verification card 108. In both cases, the outputs are transmitted to the appropriate input leads of the various cards of the CCU 44 and the interface 50, as described in detail above.

It is to be understood that this disclosure is intended as illustrative, rather than exhaustive, of the invention. Those of ordinary skill in the relevant technical field may make additions to, deletions from or changes in the embodiments disclose herein without departing from the spirit or the scope of the invention, as defined in the following claims:

We claim:

1. A medical diagnostic x-ray television imaging system employing a television chain, said system comprising:
   a) a source for propagating x-rays along a path;
   means being responsive to x-radiation incident thereon to produce a visible light image corresponding to said incident x-radiation;
   c) a video camera positionable to view said visible light image and having a target and means for scanning said target for producing a video signal representing a viewed portion of said visible light image along with synchronization signals;
   d) a monitor coupled to receive said video and synchronization signals for producing a television image corresponding to said visible right image;
   e) circuitry associated with said video camera for controlling said video camera scan at a selected one of a plurality of scan line rates, and
   f) circuitry coupled to said camera and to said scanning rate control means for suppressing transmission of said video signal from said camera to said monitor subsequent to generation of said video signal in response to the selection of at least one of said predetermined scan line rates, and for transmitting said video signals from said camera to said monitor in response to selection of another of said plurality of scan line rates.

2. A television imaging system comprising:
   a) a source for propagating x-rays along a path;
   b) apparatus and circuitry for converting a pattern of x-rays passing along said path to a video signal and synchronization signals, said converting apparatus and circuitry comprising a television camera and means for selecting from among a plurality of scan line rates for camera scanning;
   c) a monitor coupled to receive said video and synchronization signals to produce a real time image;
   d) a video storage device also coupled to receive said video and synchronization signals in parallel with said monitor, and
   e) circuitry for temporarily interrupting transmission of said video signal to said monitor while continuing transmission of said synchronization signal to said monitor, and for simultaneously maintaining transmission of both said video and synchronization signals to said video storage device, said interrupting circuitry comprising circuitry for establishing said interruption as a function of which of said plurality scan line rates is selected.

3. A medical diagnostic x-ray television chain employing x-rays, said system comprising:
   a) a source for propagating x-rays along a path;
   b) an image intensifier spaced from the source and interposable in said path, said intensifier being responsive to x-radiation incident thereon to produce a visible light image corresponding to said incident x-radiation;
   c) a video camera positionable to view said visible light image and having a target and means for scanning said target for producing a video signal representing a viewed portion of said visible light image, along with television synchronization signals;
d) a monitor coupled to receive said video and synchronization signals for producing a television image corresponding to said visible light image;
e) digital processing means also coupled to receive said video and synchronization signals for digitizing and storing information represented by said video signal;
f) means associated with said video camera for controlling said video camera scan at a selected one of a plurality of said scan rates, and
g) circuitry coupled to said camera and to said scanning rate control means for suppressing transmission of said video signal from said camera to said monitor subsequent to its generation in response to the selection of at least one of said predetermined scan rates and for transmitting said video signal from said camera to said monitor in response to selection of another of said plurality of scan rates, said suppressing circuitry not operating to suppress transmission of said video signal to said digital means while said suppression of said video signal transmitted to said monitor is taking place.

* * * * *